(12) United States Patent
Sato et al.

(10) Patent No.: US 8,133,955 B2
(45) Date of Patent: Mar. 13, 2012

(54) AROMATIC POLYESTER RESIN COMPOSITION AND PROCESS FOR PRODUCTION THEREOF

(75) Inventors: Hiroyuki Sato, Iwaki (JP); Kazuyuki Yamane, Iwaki (JP); Yuki Hokari, Nagoya (JP); Fuminori Kobayashi, Iwaki (JP); Toshihiko Ono, Iwaki (JP)

(73) Assignee: Kureha Corporation, Tokyo (JP)

( * ) Notice: Subject to any disclaimer, the term of this patent is extended or adjusted under 35 U.S.C. 154(b) by 0 days.

(21) Appl. No.: 12/449,095

(22) PCT Filed: Jan. 22, 2008

(86) PCT No.: PCT/JP2008/050770
§ 371 (c)(1),
(2), (4) Date: Nov. 18, 2009

(87) PCT Pub. No.: WO2008/090869
PCT Pub. Date: Jul. 31, 2008

(65) Prior Publication Data
US 2010/0063219 A1 Mar. 11, 2010

(30) Foreign Application Priority Data
Jan. 22, 2007 (JP) ................. 2007-011810

(51) Int. Cl.
*C08G 63/91* (2006.01)

(52) U.S. Cl. ........ 525/411; 525/410; 525/415; 525/450; 525/437; 528/481

(58) Field of Classification Search ................. 525/410, 525/411, 415, 450, 437; 528/481
See application file for complete search history.

(56) References Cited

U.S. PATENT DOCUMENTS

| 4,424,242 A * | 1/1984 | Barbee ............... 428/36.6 |
| 4,565,851 A * | 1/1986 | Barbee ............... 525/437 |
| 2006/0100392 A1 * | 5/2006 | Yamane et al. ......... 525/437 |

FOREIGN PATENT DOCUMENTS

| JP | 10-060136 | 3/1998 |
| JP | 11-106496 | 4/1999 |
| JP | 2001-172488 | 6/2001 |
| JP | 2003-040990 | 2/2003 |
| JP | 2004-018730 | 1/2004 |
| JP | 2004-231953 | 8/2004 |
| JP | 2004-359909 | 12/2004 |
| JP | 2005-200516 | 7/2005 |

* cited by examiner

*Primary Examiner* — James J Seidleck
*Assistant Examiner* — Robert Jones, Jr.
(74) *Attorney, Agent, or Firm* — Wenderoth, Lind & Ponack, L.L.P.

(57) ABSTRACT

An aromatic polyester resin composition, comprising: a melt-kneaded product of 99-70 weight parts of an aromatic polyester resin and 1-30 wt. parts (providing a total of 100 wt. parts together with the aromatic polyester resin) of a polyglycolic acid resin, wherein the composition is characterized by a transesterification rate $C_{TE}$ (%) of 20-60% determined by formula (1) below based on a peak integration ratio of methylene group in polyglycolic acid appearing at σ4.87 ppm with reference to tetramethylsilane according to $^1$H-NMR measurement:

$$C_{TE}(\%) = (1 - I(B)/I(A)) \times 100 \qquad (1),$$

wherein I (A): a peak integration ratio of the methylene group of the polyglycolic acid main chain with respect to the alkylene group of the aromatic polyester main chain calculated from the components weight ratio; and I (B): a peak integration ratio of the methylene group of polyglycolic acid main chain to the alkylene group of the aromatic polyester main chain in the resin composition. As a result, the aromatic polyester resin composition obtained by adding a relatively small amount of polyglycolic acid resin is provided with a good harmony of gas-barrier property and transparency.

8 Claims, 4 Drawing Sheets

AROMATIC POLYESTER RESIN COMPOSITION AND PROCESS FOR PRODUCTION THEREOF

This application is the United States national stage of International Application No. PCT/JP2008/050770, filed Jan. 22, 2008, which was published under PCT Article 21 in English as International Publication No. WO 2008/090869A1, and which claims benefit of Japanese Patent Application No. 011810/2007 filed Jan. 22, 2007 and the text of application 011810/2007 is incorporated by reference in its entirety herewith.

TECHNICAL FIELD

The present invention relates to an improvement of an aromatic polyester resin composition provided with an improved gas-barrier property by addition of a polyglycolic acid resin, more specifically to an aromatic resin composition with a harmony of gas-barrier property and transparency, and a process for production thereof.

BACKGROUND ART

Aromatic polyester resins, as represented by polyethylene terephthalate, are excellent in shapability, mechanical properties, transparency, etc. and are widely used as a packaging material for various foods and containers for beverages, etc. However, as a packaging material, particularly for foods to be stored for a long period, the gas-barrier property of an aromatic polyester resin is not sufficient so that the deterioration of contents has been inevitable.

On the other hand, polyglycolic acid resin is known to have particularly excellent gas-barrier property in addition to heat resistance and mechanical strength (e.g., Patent document 1 listed below), and it has been proposed to add a small amount thereof to an aromatic polyester resin to provide an aromatic polyester resin composition improved in gas-barrier property of the latter (Patent documents 2 and 3). However, aromatic polyester resin and polyglycolic acid resin are basically non-compatible with each other, and the resin composition obtained by melt-kneading these resins is caused to have a poor transparency. Moreover, it is thought that the improvement in gas barrier property by addition of a relatively small amount of polyglycolic acid resin into aromatic polyester resin is based on the gas interception effect of the polyglycolic acid resin disperse phase dispersed in the matrix of aromatic polyester resin (Nonpatent document 1 listed below). According to the thought, it is understood that the lowering in transparency of such a blend composition is essentially inevitable. On the other hand, Patent document 3 has proposed to add a coupling agent, such as anhydrous pyromellitic acid, at the time of melt-kneading of an aromatic polyester resin and a relatively small amount of polyglycolic acid resin, or to use a copolymer of polyglycolic acid and isophthalic acid, etc., instead of polyglycolic acid, in order to suppress the lowering of transparency. However, in this case, while the lowering of transparency can be suppressed, the effect of improving the gas barrier property becomes scarce.

Patent document 1: JP-A 10-60136
Patent document 2: U.S. Pat. No. 4,565,851
Patent document 3: JP-A 2005-200516
Nonpatent document 1: L. E. Nielsen; J. Macromol. Sci. (CHEM), A1 (5), 929-942 (1967).

DISCLOSURE OF INVENTION

Accordingly, a principal object of the present invention is to provide an aromatic polyester resin composition comprising an aromatic polyester resin and a relatively small amount of polyglycolic acid resin with a better harmony of gas-barrier property and transparency, and also a process for production of such a composition.

As a result of study of the present inventors with the above-mentioned object, it has been found effective to cause an appropriate degree of transesterification between the aromatic polyester resin forming a matrix, and the polyglycolic acid resin forming a disperse phase for achievement of the object. The aromatic polyester resin composition of the present invention is based on such a finding, and comprises a melt-kneaded product of 99-70 wt. parts of an aromatic polyester resin and 1-30 wt. parts (providing a total of 100 wt. parts together with the aromatic polyester resin) of a polyglycolic acid resin, wherein the composition is characterized by a transesterification rate $C_{TE}$ (%) of 20-60% determined by formula (1) below based on a peak integration ratio of methylene group in polyglycolic acid appearing at σ4.87 ppm with reference to tetramethylsilane according to $^1$H-NMR measurement:

$$C_{TE}(\%) = (1 - I(B)/I(A)) \times 100 \qquad (1),$$

wherein I (A): a peak integration ratio of the methylene group of the polyglycolic acid main chain with respect to the alkylene group of the aromatic polyester main chain calculated from the components weight ratio; and I (B): a peak integration ratio of the methylene group of polyglycolic acid main chain to the alkylene group of the aromatic polyester main chain in the resin composition.

Moreover, the process for producing an aromatic polyester resin composition of the present invention, comprises melt-kneading 99-70 wt. parts of an aromatic polyester resin, and 1-30 wt. parts (providing a total of 100 wt. parts together with the aromatic polyester resin) of a polyglycolic acid resin, and heat-treating the composition during or after the melt-kneading to cause transesterification so as to provide a controlled transesterification rate $C_{TE}$ (%) in a range of 20 to 60%.

Figure 1:
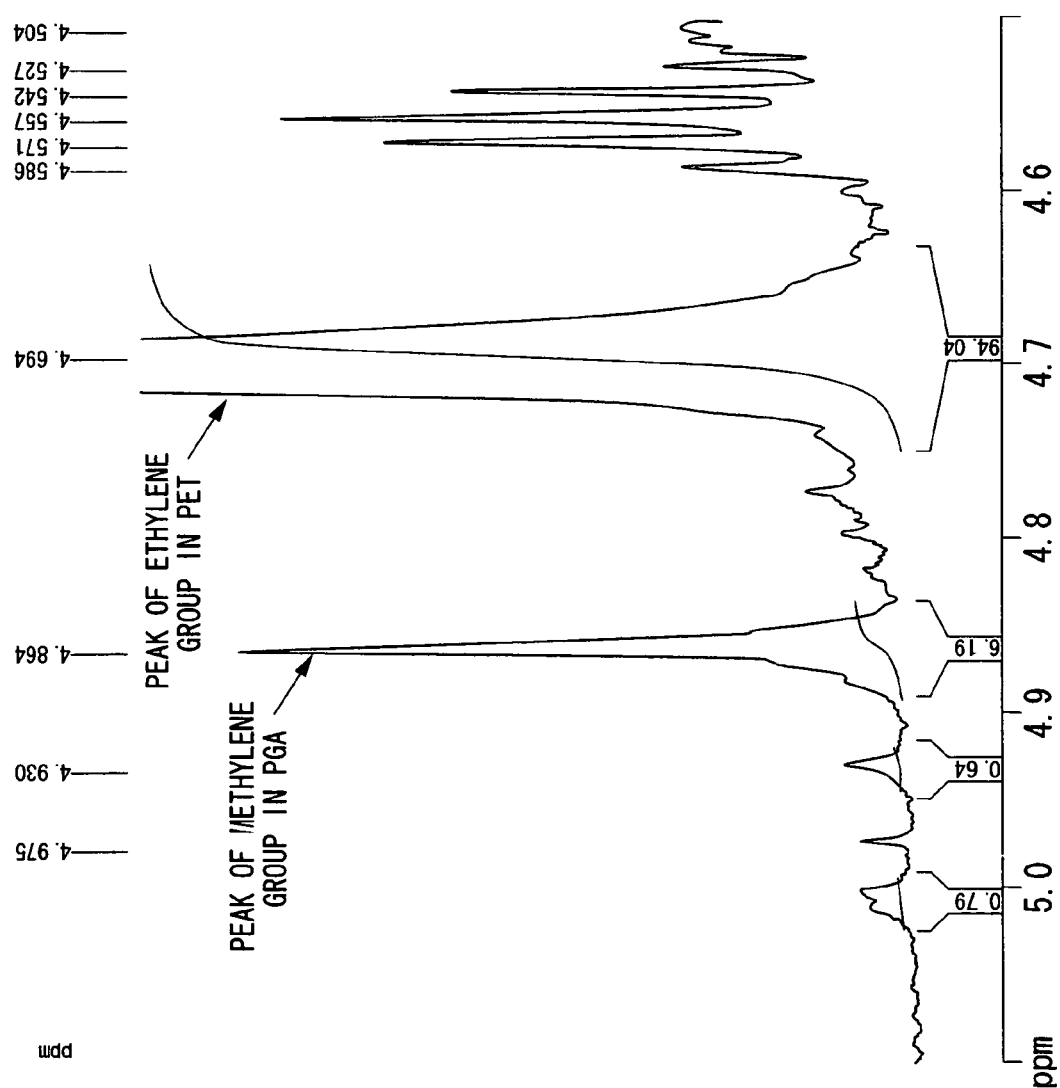
FIG. 1 is a copy of $^1$H-NMR chart of a resin composition obtained in Example 1.

BEST MODE FOR PRACTICING THE INVENTION (Aromatic Polyester Resin)

The resin composition of the present invention contains, as a principal resin component, an aromatic polyester resin, specific examples of which may include: polyethylene terephthalate, polytrimethylene terephthalate, polybutylene terephthalate, polyhexamethylene terephthalate; polyethylene-2,6-naphthalate, polytrimethylene-2,6-naphthalate, polybutylene-2,6-naphthalate, polyhexamethylene-2,6-naphthalate, polyethylene isophthalate, polytrimethylene isophthalate, polybutylene isophthalate, polyhexamethylene isophthalate, poly-1,4-cyclohexane-dimethanol terephthalate, and polybutylene adipate terephthalate. Among these, polyethylene terephthalate is preferably used. Herein, the term polyethylene terephthalate (hereinafter sometimes abbreviated as "PET") is used to inclusively mean a polyester principally comprising a terephthalic acid unit derived from terephthalic acid or an ester derivative thereof, and an ethylene glycol unit derived from ethylene glycol or an ester derivative thereof, wherein at most 10 mol. % of each unit can be replaced with another dicarboxylic acid, such as phthalic acid, isophthalic acid or naphthalene-2,6-dicarboxylic acid, or another diol such as diethylene glycol, or a hydroxycarboxylic acid, such as glycolic acid, lactic acid or hydroxybenzoic acid.

The aromatic polyester resin may preferably have an intrinsic viscosity (as a measure corresponding to a molecular weight) in the range of 0.6-2.0 dl/g, particularly 0.7-1.5 dl/g. Too low an intrinsic viscosity makes the shaping difficult, and too high an intrinsic viscosity results in generation of a large shearing heat.

While aromatic polyester resin are generally produced through polycondensation by using compounds of metals, such as antimony (Sb), germanium (Ge), tin (Sn), zinc (Zn), aluminum (Al) and titanium (Ti), and the physical properties of the product may somewhat change depending on catalyst species used, it is possible in the present invention to use any aromatic polyester resins, inclusive of commercial products, obtained by using any metal compounds (catalyst). As a metal compound (catalyst), it is preferred to use an organic complex or oxide, especially an oxide. The content in the aromatic polyester resin may be usually at least 1 ppm and less than 1000 ppm, and the use of a larger amount causes coloring of the resultant aromatic polyester resin and an increase manufacturing cost.

The resin composition of the present invention comprises the above-mentioned aromatic polyester resin, as a principal component, in an amount of 99-70 wt. parts, preferably 95-75 wt. parts. If used in excess of 99 wt. parts, it becomes difficult to attain the intended increase in gas-barrier property because the amount of the polyglycolic acid resin is decreased correspondingly. On the other hand, below 70 wt. parts so as to attain a corresponding increase of the polyglycolic acid resin amount, the decrease in moisture resistance of the resultant composition can be problematic.

(Polyglycolic Acid Resin)

The polyglycolic acid resin (hereinafter sometimes referred to as "PGA resin") used in the present invention may include: glycolic acid homopolymer (PGA) consisting only of a recurring unit represented by —(O.CH$_2$.CO)— (including the one obtained by ring-opening polymerization of glycolide) and also a polyglycolic acid copolymer.

Examples of comonomer providing a polyglycolic acid copolymer together with a glycolic acid monomer such as glycolide may include: cyclic monomers, inclusive of ethylene oxalate (i.e., 1,4-dioxane-2,3-dione); lactides; lactones, such as β-propiolactone, β-butyrolactone, pivalolactone, γ-butyrolactone, ε-valerolactone, β-methyl-ε-valerolactone, and ε-caprolactone; carbonates, such as trimethylene carbonate; ethers, such as 1,3-dioxane; ether-esters, such as dioxanone; and amides, such as ε-caprolactam; and also hydroxycarboxylic acids, such as lactic acid, 3-hydroxy-propanoic acid, 3-hydroxy-butanoic acid, 4-hydroxy-butanoic acid, and 6-hydroxy-caproic acid, and alkyl esters of these; substantially equi-molar mixtures of aliphatic diols, such as ethylene glycol and 1,4-butane-diol, and aliphatic carboxylic acids, such as succinic acid and adipic acid and alkyl esters thereof; and mixtures of two or more species thereof. However, in order to impart a high level of gas-barrier property to the aromatic polyester resin, it is preferred to retain at least 70 wt. % of the above-mentioned glycolic acid recurring unit in the PGA resin, and PGA homopolymer is particularly preferred.

The PGA resins may have a wide molecular weight range and can also be an oligomer. More specifically, it is preferred to use a PGA resin having a molecular weight (in terms of Mw (weight-average molecular weight) based on polymethyl methacrylate as measured by GPC using hexafluoroisopropanol solvent) in the range of ordinarily 10,000-500,000. Particularly, in order to accelerate the transesterification during the melt-kneading, it is preferred to use a PGA resin having a weight-average molecular weight of 20,000 or below. Even in this case, however, an excessively small weight-average molecular weight is not preferred since the resultant resin composition is liable to have a lower strength.

In order to provide an aromatic polyester resin composition with a high strength, it is preferred to use a PGA resin having a weight-average molecular weight of at least 30,000, preferably 50,000 or more. Even in this case, however, an excessively large molecular weight causes a difficulty in melt-kneading with aromatic polyester resin, thus being liable to result in a rather lower strength.

In order to provide a PGA resin having such a high molecular weight, it is preferred to use a PGA resin obtained through a process of subjecting glycolide (and also a small amount of another cyclic monomer, as desired) to ring-opening polymerization under heating, is used. The ring-opening polymerization is substantially a ring-opening polymerization according to bulk polymerization. The ring-opening polymerization is generally performed at a temperature of at least 100° C. in the presence of a catalyst. In order to suppress the lowering in molecular weight of the PGA resin during melt-kneading, it is preferred to suppress the residual glycolide content in the PGA resin used to below 0.5 wt. %, preferably below 0.2 wt. %, particularly below 0.1 wt. %. For this purpose, it is preferred to control the system at a temperature of below 190° C., more preferably 140-185° C., further preferably 160-180° C., so as to proceed with at least a terminal period (preferably a period of monomer conversion of at least 50%) of the polymerization in a solid phase as disclosed in WO2005/090438A, and it is also preferred to subject the resultant polyglycolic acid to removal of residual glycolide by release to a gaseous phase. As the ring-opening polymerization catalyst, it is possible to use oxides, halides, carboxylic acid salts, alkoxides, etc., of tin, titanium, aluminum, antimony, zirconium, zinc, germanium, etc. Among these, it is particularly preferred to use a tin compound, especially tin chloride in view of polymerization activity and colorlessness. However, there has been still observed a tendency that as the residual tin (calculated as metal) content in the resultant PGA resin is increased, the glycolide gas generation during the melt-processing or later processing with the aromatic polyester resin is increased, so that the residual tin (as metal) content should preferably be at most 70 ppm (or at most ca. 100 ppm calculated as tin chloride).

(Melt-Kneading•Heat-Treatment)

The resin composition of the present invention is obtained by melt-kneading 99-70 wt. parts of the above-mentioned aromatic polyester resin and 1-30 wt. parts of the PGA resin, followed by optional heat-treating, to control the transesterification rate $C_{TE}$ according the above formula (1) to be within the range of 20-60%.

For the melt-kneading, a single-screw extruder and a twin screw extruder may preferably be used for a commercial use but a plastomill, a kneader, etc., may also be used. The melt-kneading temperature may generally be determined as a temperature above a higher one of the melting points of the two components to be melt-kneaded, i.e., the aromatic polyester resin and the polyglycolic acid resin. In view of the fact that the melting point of the aromatic polyester resin, particularly polyethylene terephthalate (PET), is ordinarily ca. 260° C. and that of PGA is ca. 220° C., a temperature of at least ca. 260° C. is generally adopted but it is preferred to adopt an optimum temperature based on the melting point of an aromatic polyester resin actually used. As a certain degree of heat evolution can occur accompanying the melt-kneading, it is possible correspondingly to set the temperature of the melt-kneading apparatus to the melting point or therebelow of the aromatic polyester resin. The melt-kneading temperature, preferably the extruder set temperature, may generally be in the range of 220-350° C., more preferably 240-330° C., further preferably 260-360° C. A temperature below 220° C. is insufficient or requires a long time for formation of a melt state and is further liable to be insufficient for development of barrier property of the resultant composition. On the other hand, a melt-kneading temperature in excess of 350° C. is liable to cause coloring or a lowering of barrier property due to occurrence of decomposition or side reactions.

The melt-kneading time should be controlled to provide the desired transesterification rate while it may depend on the shape, position and rotation conditions of a screw in the stirring apparatus or extruder. It is ordinarily selected from the range of 30 sec. to 60 min., preferably 1-45 min. In the case of using a low-molecular weight PGA resin having a weight-average molecular weight of 20,000 or below, a range of 1 min. to 15 min., particularly 2 min. to 20 min., is preferred.

In the case of using a high-molecular weight resin having a weight-average molecular weight of 30,000 or higher, the desired transesterification rate of 20-60% is achieved by extending the melt-kneading time, or by adding a transesterification catalyst so as to accomplish the desired transesterification rate during the melt-kneading, or by heat-treating the resin composition after the melt-kneading.

The melt-kneading time for attaining the desired transesterification rate during the melt-kneading by extending the melt-kneading time is generally chosen from the range of 7 minutes to 15 minutes, while it can be greatly influenced by melt-kneading temperature.

The transesterification during the melt-kneading can also be promoted by addition of a transesterification catalyst. A polycondensation catalyst generally used for polyester formation may be effectively used as a transesterification catalyst. For example, it is possible to include 200-600 ppm of diantimony trioxide into the melt-kneading composition. However, since the tendency of coloring and decomposition of a composition will increase if it is used in an excessive amount. Accordingly, it is generally advisable to utilize the function as a transesterification catalyst of the polycondensation catalyst contained in the aromatic polyester resin, and further addition of the transesterification catalyst is not necessarily preferred.

Even when the desired transesterification rate is not obtained during the melt-kneading, the transesterification rate can be increased by heat treatment of the resin composition after the melt-kneading. Generally, the heat treatment is performed below the melting point of aromatic polyester resin, e.g., at 170-250° C. The time is generally in the range of 5 minutes to 20 hours and controlled by the accomplished transesterification rate. The heat treatment is more preferably performed under the conditions of 10 minutes-3 hours at 200-240° C.

Anyway, the transesterification rate of the resin composition obtained through melt-kneading and optional heat treatment has to be controlled in the range of 20 to 60%. At less than 20%, the desired transparency-improving effect cannot be acquired, and in excess of 60%, the desired gas-barrier property-improvement effect cannot be acquired. Further to say, both aromatic polyester resin and polyglycolic acid resin are polyester resins, but it is difficult to satisfy both of transparency and gas-barrier property only by mixing these resins, and it has been found that good harmony of both properties is obtained for the first time when both resins are mixed in the limited range and the transesterification rate defined by the formula (1) is controlled in the range of 20 to 60% as stipulated according to the present invention.

It has been recognized that as the transesterification proceeds, the glass transition temperature (Tg) and the melting point of the aromatic polyester resin are lowered to result in an increased transparency when the melting point is lowered by 10° C. or more from the glass transition temperature of the aromatic polyester resin alone, and the lowering by more than 50° C. from the melting point of the aromatic polyester resin alone leads to a non-desirable decrease of the gas-barrier property.

Various stabilizers may be added, as desired, during the melt-kneading. A representative example of such optionally added stabilizers may be a metal-deactivating agent, specific examples of which may include: phosphorus-containing compounds, such as phosphoric acid, trimethyl phosphate, triphenyl phosphate, tetra-ethylammonium-hydroxide-3,5-di-t-butyl-4-hydroxybenzyl-phosphoric acid diethyl ester (including "Irganox 1222" made by Ciba-Geigy A.G. as a commercially available example), calcium-diethylbis [[[3,5-bis(1,1-dimethyl)-4-hydroxyphenyl]-methyl]phosphate ("Irganox 1425WL"), tris (2,4-di-t-butylphenyl) phosphite ("Irganox 168"), and further phosphoric acid esters having a pentaerythritol skeleton, such as cyclic neopentane-tetra-il-bis (2,6-di-t-butyl-4-methylphenyl phosphite ("ADEKASTAB PEP-36", made by K.K. ADEKA); and phosphorus compounds having at least one hydroxyl group and at least one long-chain alkyl ester group, such as a nearly equi-molar mixture of mono- and di-stearyl phosphates ("ADEKASTAB AX-71"); hindered phenol compounds, such as tetrakis [methylene-3-(3,5'-di-t-butyl-4'-hydroxyphenyl)propionate-methane] ("Irganox 1010"); and compounds generally showing a deactivating action against polyester polymerization catalysts, inclusive of hydrazine compounds having a —CO—NHNH—CO unit, such as bis[2-(2-hydroxy-benzoyl)-hydrazine]dodecanoic acid and N,N'-bis[3-(3,5-di-tert-butyl-4-hydroxyphenyl)propionyl]hydrazine, and further triazole compounds, such as 3-(N-salicyloyl)amino-1,2,4-triazole.

Such a metal-deactivating agent may preferably be one which is mutually soluble in a molten state with or can be dissolved in either of the aromatic polyester resin and the PGA resin. As the melt-kneading temperature is relatively high, one having properties such as a high melting point and a high decomposition temperature, is preferably used. It is however not desirable to add an excessive amount of such a metal-deactivating agent, as it tends to obstruct the transesterification intended by the present invention.

It is also possible to add a carbodiimide compound or oxazoline compound known as a moisture resistance-improving agent, in an amount of at most 1 wt. % of the PGA resin (ring-opening polymerization). An amount of 1 wt. % or more can be added in the case of a PGA obtained through polycondensation.

EXAMPLES

Hereinbelow, the present invention will be described more specifically based on Examples and Comparative Examples.

The characteristic values described herein including the following Examples are based on those measured or evaluated according to the following methods.

[Intrinsic Viscosity]

A PET sample in an amorphous state was dissolved in phenol/1,1,2,2-tetrachloroethane and subjected to measurement of intrinsic viscosity (IV, unit: dl/g) by means of an Ubbelohde viscometer No. 1 (viscometer constant: 0.1173) according to JIS K7390.

[Molecular Weight]

Ca. 10 mg of a PGA sample was dissolved in 0.5 ml of high-grade dimethyl sulfoxide on an oil bath at 150° C. The solution was cooled by cold water, and a 5 mM-sodium trifluoroacetate solution in hexafluoroisopropanol (HFIP) was added to the solution up to a total volume of 10 ml. The solution was filtered through a 0.1 μm-membrane filter of PTFE and then injected into a gel permeation chromatography (GPC) apparatus to measure a weight-average molecular weight (Mw). Incidentally, the sample solution was injected into the GPC apparatus within 30 min. after the dissolution.

<GPC Measurement Conditions>

Apparatus: "Shodex-104", made by Showa Denko K.K.
Columns: 2 columns of "HFIP-606M" connected in series with one pre-column of "HFIP-G".
Column temperature: 40° C.
Fluent: 5 mM-sodium trifluoroacetate solution in HFIP.
Flow rate: 0.6 ml/min.
Detector: RI (Differential refractive index detector)
Molecular weight calibration: Performed by using 7 species of standard polymethyl methacrylate having different molecular weights.

[Haze]

A stretched film sample was subjected to measurement by using "NDH2000" made by Nippon Denshoku K.K. according to JISK7361-1.

[NMR Peak Integration Ratio]
<Transesterification Rate>

After dissolving 20 mg of a sheet polymer sample in 0.5 ml of hexafluoroisopropanol, 0.5 ml of deuterated chloroform containing 0.1 wt. % of tetramethylsilane was added, and the solution was subjected to measurement with a $^1$H-NMR apparatus ("Ultra Shield 400 MHz", made by Bruker Co.). From the measurement result of $^1$H-NMR, the peak integration ratio of an alkylene group of an aromatic polyester (e.g., ethylene of polyethylene terephthalate which appears at σ4.70 ppm with reference to tetramethylsilane), and the peak integration ratio of the methylene group of polyglycolic acid which appears at σ4.87 ppm, a transesterification rate $C_{TE}$ (%) was calculated from the formula (1) below:

$$C_{TE}(\%)=\{1-I(B)/I(A)\}\times 100 \qquad (1)$$

wherein I (A): a peak integration ratio of the methylene group of the polyglycolic acid main chain with respect to the ethylene group of the polyethylene terephthalate (PET) main chain calculated from the components weight ratio; and I (B): a peak integration ratio of the methylene group of polyglycolic acid main chain to the ethylene group of the polyethylene terephthalate main chain in the resin composition.

Figure 2:
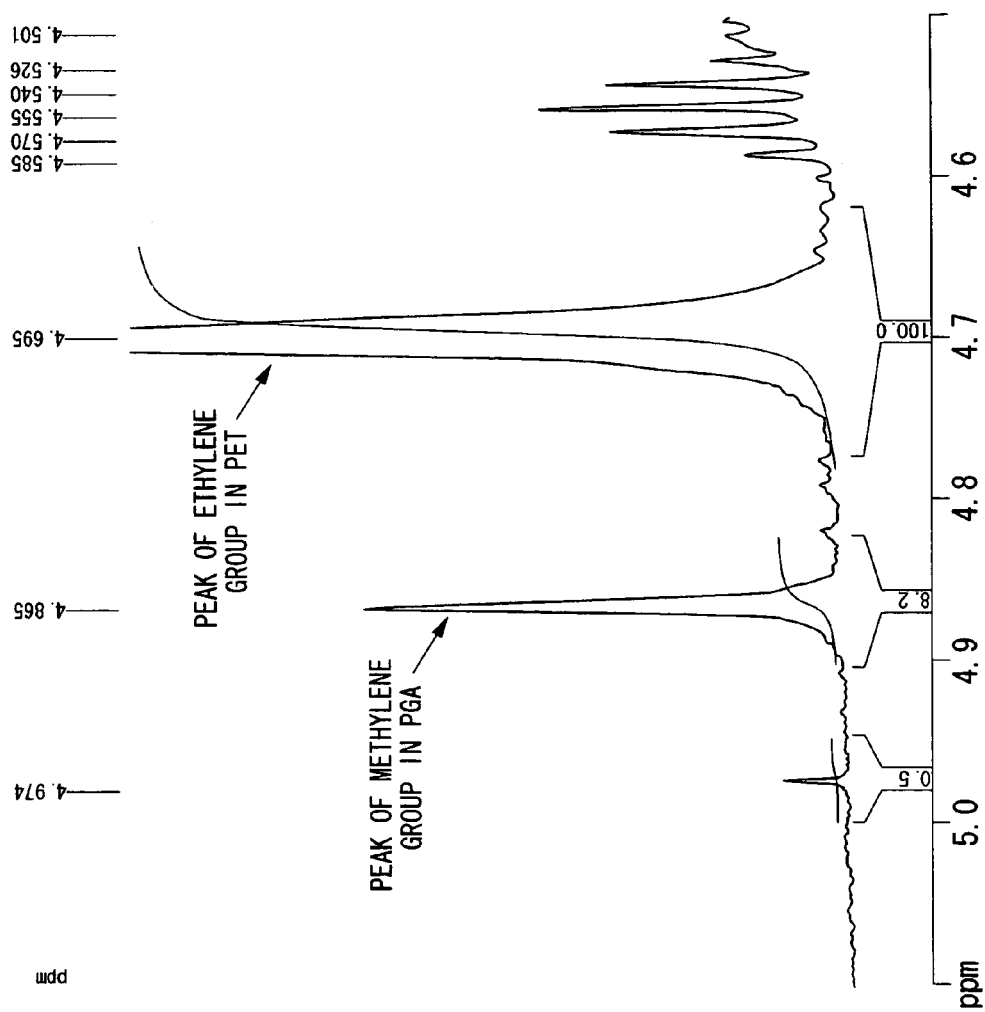
FIG. 2 is a copy of $^1$H-NMR chart of a resin composition obtained in Comparative Example 1.
Figure 3:
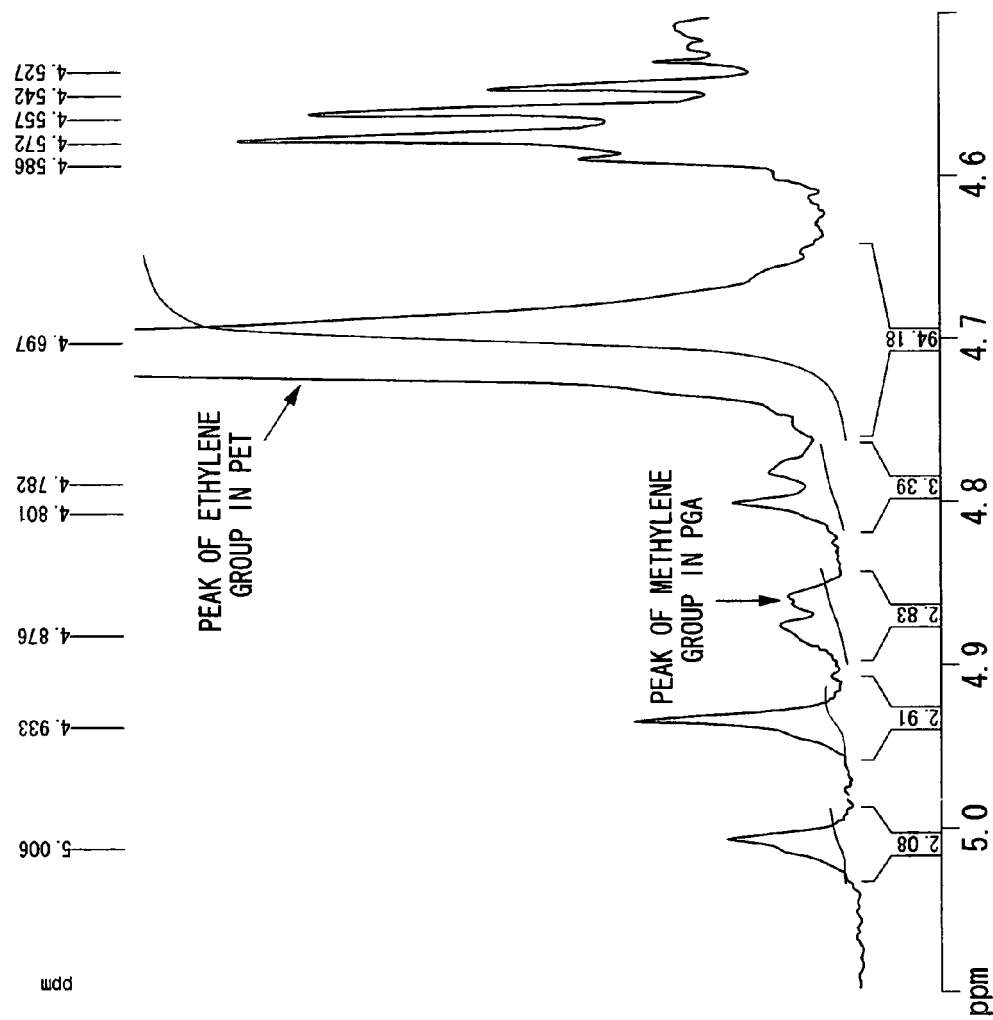
FIG. 3 is a copy of the $^1$H-NMR chart of the resin composition obtained in Comparative Example 2.

For reference, $^1$H-NMR charts obtained by Example 1, Comparative Example 1, and Comparative Example 2 are attached as FIGS. 1-3, respectively.

As for Example 1 using, e.g., 95 wt. parts of PET and 5 wt. parts of PGA, if the peak integration ratio of the ethylene of PET is set to 1 and the molecular weight 58 of the recurring unit (—COO—CH$_2$—) of PGA and the molecular weight 192 of the recurring unit (-Ph-COO—C$_2$H$_4$—OCO—) PET are taken into consideration, I(A) is calculated as follows: I(A)={(5/58)/(95/192)}/2=0.087.

(Incidentally, instead of the calculation based on the components ratio, the value of I (A) can also be calculated as follows based on measured composition data. For example, a 100-mm-thick sheet of the resin composition is hydrolyzed with 10 wt. %-sodium hydroxide aqueous solution at 90° C. in 6 hours, and the isolated glycolic acid is quantified with liquid chromatography. From the determined quantity value, the weight ratio of PGA (polyglycolic acid) to PET in the resin composition can be calculated, and I (A) can be calculated from the weight ratio. For example, when glycolic acid is contained at 6.4 wt. % in the hydrolyzed product as a result of the quantification according to liquid chromatography, it means that PGA was contained in the resin composition at 6.4×(58/74)=5%, and I(A) can be calculated as I(A)={(5/58)/(95/192)}/2=0.087 similarly as the calculation result by the above-mentioned components ratio.)

In the NMR chart (FIG. 1) measured with respect to the melt-kneaded and heat-treated composition pellets of Example 1, I(B) is calculated as I(B)=6.19/94.04=0.065 from the peak integration value of 94.04 recorded under the ethylene peak of PET, and the peak integral value of 6.19 recorded under the methylene group peak of PGA, so that the transesterification rate $C_{TE}$ can be calculated as $$C_{TE}=(1-0.065/0.087)\times 100=25\%.$$

[Oxygen Permeability]

A film sample was subjected to measurement under the conditions of 23° C. and a relative humidity of 90% by means of an oxygen permeability meter ("OX-TRAN100", made by Mocon Co.). The measurement result was recorded as an oxygen permeability normalized at a thickness of 20 μm in the unit of cc/m$^2$/day/atm.

Polyglycolic Acid (PGA) Production Example

Into a hermetically sealable vessel equipped with a jacket, 355 kg of glycolide (made by Kureha Corporation; impurity contents: glycolic acid 30 ppm, glycolic acid dimer 230 ppm, moisture 42 ppm) was added, and the vessel was hermetically sealed up. Under stirring, the contents were melted by heating up to 100° C. by circulation of steam to the jacket, thereby forming a uniform solution. To the solution under stirring, 10.7 g of tin dichloride dehydrate and 1220 g of 1-dodecyl alcohol were added.

While being held at a temperature of 100° C., the contents were transferred to plural tubes of metal (SUS304) and 24 mm in inner diameter held within a polymerization apparatus. The apparatus included a body installing the tubes and an upper plate, each equipped with a jacket allowing circulation of a heat medium oil thereinto. After the contents were transferred into the tubes, the upper plate was immediately affixed.

A heat medium oil at 170° C. was circulated to the jackets for the body and the upper plate, and this state was held for 7 hours. After the 7 hours, the heat medium oil was cooled to room temperature, the upper plate was removed, and the body was vertically rotated upside down to take out lumps of produced polyglycolic acid. The lumps were pulverized by a pulverizer and then dried at 120° C. overnight to obtain a PGA pulverizate.

To the above-obtained PGA pulverizate, an almost equimolar mixture of mono- and di-stearyl acid phosphates ("ADEKASTAB AX-71", made by K.K. ADEKA) as a metal deactivating agent was added in a proportion of 300 ppm with respect to the PGA pulverizate, and the resultant mixture was extruded through a twin-screw extruder to obtain PGA pellets. The thus-obtained PGA pellets were heat-treated at 200° C. for 9 hours in a drier with a nitrogen atmosphere.

The resultant PGA pellets exhibited a weight-average molecular weight of 215,000 and a glycolide content of 0.05 wt. %. The PGA pellets were used in the following Examples.

<Extrusion Conditions>
Extruder: "TEM-41SS", made by Toshiba Kikai K.K.
Temperature set: The sections C1-C10 disposed sequentially from the discharge position and the die were set to temperatures of 200° C., 230° C., 260° C., 270° C., 270° C., 270° C., 270° C., 250° C., 240° C., 230° C. and 230° C., respectively.

Glycolic Acid Oligomer Synthesis Example

Into a stirring vessel equipped with a jacket, 70 wt. %-glycolic acid aqueous solution was charged and the liquid in the vessel was heated to 200° C. to effect the condensation reaction, while causing water flow out of the system. Then, the internal pressure in the vessel was reduced stepwise to distill off low boiling materials, such as generated water and an unreacted raw material, and the obtained glycolic acid oligomer (GAO) in the form of lumps was pulverized and dried at 120° C. overnight to obtain a GAO pulverizate. The weight-average molecular weight of the obtained GAO pulverizate was 14,000.

Example 1

95 wt. parts of polyethylene terephthalate (PET) pellets ("1101", made by KoSa Co.; antimony content: 201 ppm in PET) and 5 wt. parts of the above PGA pellets, were uniformly blended in a dry state; and melt-processed through a twin-screw extruder equipped with a feeder ("LT-20", made by K.K. Toyo Seiki) under the condition of residence time in the extruder of 5 min. to obtain a pellet-form resin composition, which was then heat-treated in a dry state for 1 hour in a drier heated at 240° C. and cooled to room temperature to be take out as pellets.

The thus-obtained pellet-form resin composition was sandwiched with aluminum sheets and placed on a heat press machine at 270° C., followed by heating for 3 min. and pressing under 5 MPa for 1 min. Immediately thereafter, the sandwich was transferred to a water-circulated press machine and held under a pressure of 5 MPa for ca. 3 min. to obtain an amorphous press sheet.

The thus-obtained press sheet was fixed on a frame, held at 100° C. for 1 min. and then subjected to blow stretching until the thickness was reduced to ca. 1/10 (ca. 10 times in terms of an areal ratio). The resultant stretched film was heat-treated at 200° C. for 1 min. in a relaxed state to obtain a 22 μm-thick stretched and heat-treated film.

(Extrusion Conditions)
Temperatures: C1: 250° C., C2: 290° C., C3: 290° C., die: 290° C.
Screw rotation speed: 30 rpm.
Feeder rotation speed: 20 rpm.
Residence time in the extruder: 5 min.

Example 2

A stretched and heat-treated film was prepared in the same manner as in Example 1 except that the resin composition pellets obtained through melt-processing were heat-treated for 1 hour at 220° C.

Example 3

A stretched and heat-treated film was prepared in the same manner as in Example 1 except that the blend ratio was changed to 90 wt. parts of the PET pellets and 10 wt. parts of the PGA pellets.

Example 4

A stretched and heat-treated film was prepared in the same manner as in Example 1 except that the blend ratio was changed to 75 wt. parts of the PET pellets and 25 wt. parts of the PGA pellets.

Example 5

A stretched and heat-treated film was prepared in the same manner as in Example 1 except for using the GAO pulverizate obtained in Glycolic acid oligomer Synthesis Example instead of the PGA pellets and omitting the heat-treatment at 240° C. for the pellets.

Example 6

In the operation of Example 1, the melt-processing was performed by changing the feeder rotation speed to 10 rpm so as to change the melt-kneading time in the extruder to 10 min., thereby obtaining resin composition pellets. The resin composition pellets were used for preparation of a stretched and heat-treated film in the same manner as in Example 1 except for omitting the heat-treatment of the pellets at 240° C.

Example 7

A stretched and heat-treated film was prepared in the same manner as in Example 1 except that 0.06 wt. part of diantimony trioxide (made by Wako Jun'yaku Kogyo K.K.) was added to 100 wt. parts of the resin composition at the time of melt-processing, and the heat-treatment of the resin composition pellets at 240° C. was omitted.

Comparative Example 1

A stretched and heat-treated film was prepared in the same manner as in Example 1 except for omitting the heat-treatment of the resin composition pellets at 240° C.

Comparative Example 2

In the operation of Example 1, the melt-processing was performed by changing the feeder rotation speed to 5 rpm so as to change the melt-kneading time in the extruder to 17 min., thereby obtaining resin composition pellets. The resin composition pellets were used for preparation of a stretched and heat-treated film without further heat-treatment of the pellets in the same manner as in Comparative Example 1.

Comparative Example 3

A stretched and heat-treated film was prepared in the same manner as in Comparative Example 1 except that the blend ratio was changed to 90 wt. parts of the PET pellets and 10 wt. parts of the PGA pellets.

Comparative Example 4

A stretched and heat-treated film was prepared in the same manner as in Comparative Example 1 except that the blend ratio was changed to 75 wt. parts of the PET pellets and 25 wt. parts of the PGA pellets.

Reference Example

A stretched and heat-treated film was prepared in the same manner as in Comparative Example 1 except that the extrusion was performed by using only 100 wt. parts of the PET pellets.

Figure 4A:
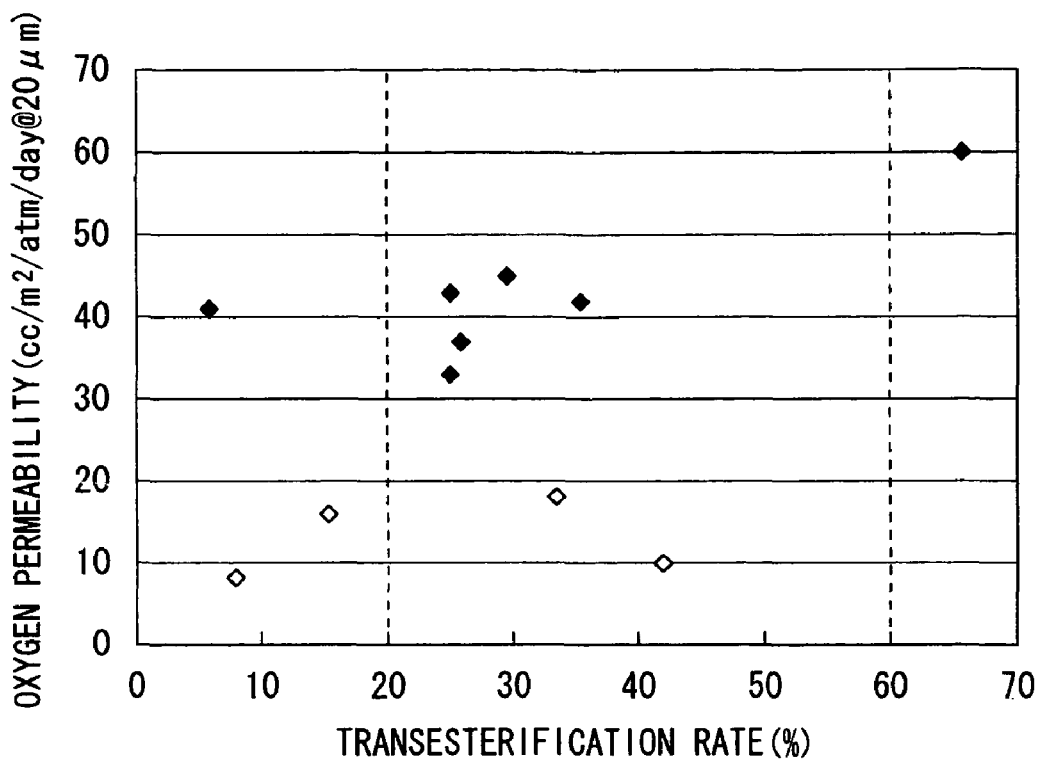
FIGS. 4 (a) and 4(b) are graphs which show plots of oxygen permeabilities and haze values, respectively, versus transesterification rates of films formed from the compositions obtained in Examples and Comparative Examples.
Figure 4B:
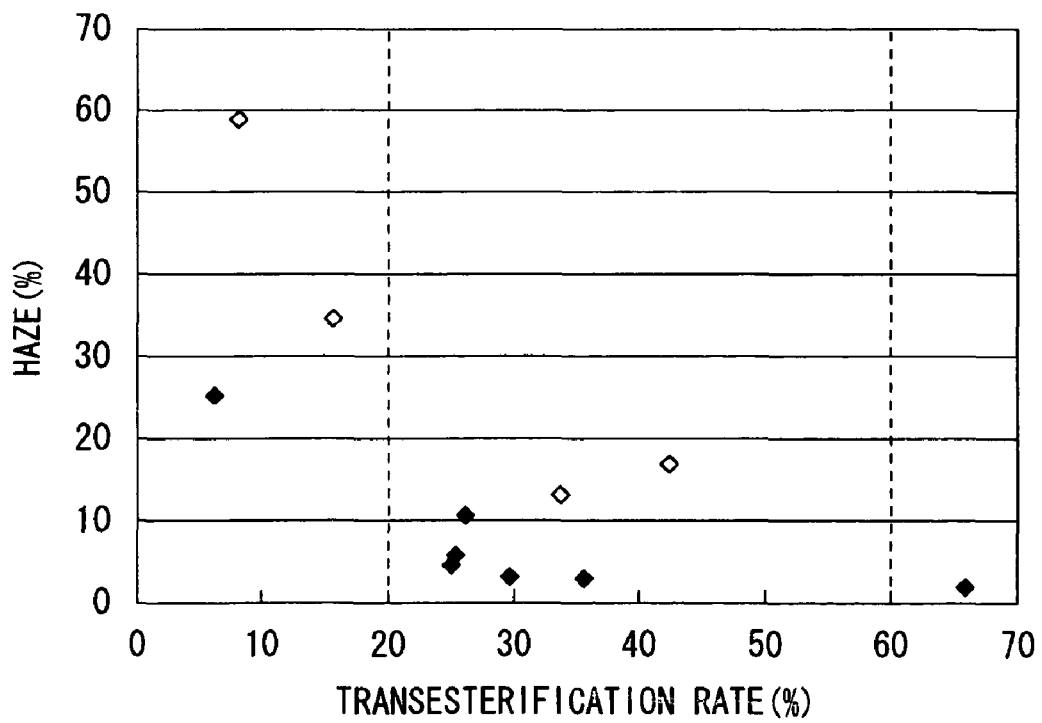

General features and evaluation results of the resultant films of the above-described Examples Comparative Examples and Reference Example, are inclusively shown in the following Table 1. Further, plots of oxygen permeabilities and haze values versus the transesterification rates are shown in FIGS. 4(a) and 4(b), respectively.

TABLE 1

|  |  |  | Example |  |  |  |  |  |
|---|---|---|---|---|---|---|---|---|
|  |  |  | 1 | 2 | 3 | 4 | 5 | 6 |
| PGA molecular weight |  |  | 215000 | 215000 | 215000 | 215000 | 14000 | 215000 |
| PET/PGA ratio | (weight/weight) |  | 95/5 | 95/5 | 90/10 | 75/25 | 95/5 | 95/5 |
| Melt-kneading | Temperature | (° C.) | 290 | 290 | 290 | 290 | 290 | 290 |
|  | Time | (min.) | 5 | 5 | 5 | 5 | 5 | 10 |
| Pellet | Temperature | (° C.) | 240 | 220 | 240 | 240 | — | — |
| heat treatment | Time | (hours) | 1 | 1 | 1 | 2 | — | — |
| Evaluation | Oxygen permeability | *1 | 33 | 37 | 18 | 10 | 45 | 43 |
|  | Haze | (%) | 5 | 11 | 13 | 17 | 3 | 6 |
|  | Peak integration I (B) | (—) | 0.065 | 0.065 | 0.122 | 0.320 | 0.061 | 0.065 |
|  | I (A) | (—) | 0.087 | 0.087 | 0.184 | 0.552 | 0.087 | 0.087 |
|  | Transesterification rate $C_{TE}$ | (%) | 25 | 25 | 34 | 42 | 30 | 25 |

|  |  |  | Example |  |  |  |  |  |
|---|---|---|---|---|---|---|---|---|
|  |  |  | 7 | Com. 1 | Comp. 2 | Comp. 3 | Comp. 4 | Ref. |
| PGA molecular weight |  |  | 215000 | 215000 | 215000 | 215000 | 215000 | — |
| PET/PGA ratio | (weight/weight) |  | 95/5 | 95/5 | 95/5 | 90/10 | 75/25 | 100/0 |
| Melt-kneading | Temperature | (° C.) | 30290 | 290 | 290 | 290 | 290 | 290 |
|  | Time | (min.) | 5 *2 | 5 | 17 | 5 | 5 | 5 |
| Pellet | Temperature | (° C.) | — | — | — | — | — | — |
| heat treatment | Time | (hours) | — | — | — | — | — | — |
| Evaluation | Oxygen permeability | *1 | 42 | 41 | 60 | 16 | 8 | 78 |
|  | Haze | (%) | 3 | 26 | 2 | 35 | 59 | 0 |
|  | Peak integration I (B) | (—) | 0.056 | 0.082 | 0.030 | 0.156 | 0.507 | — |
|  | I (A) | (—) | 0.087 | 0.087 | 0.087 | 0.184 | 0.551 | — |
|  | Transesterification rate $C_{TE}$ | (%) | 35 | 6 | 66 | 15 | 8 | — |

*1: Oxygen permeability unit: cc/m2/day/atm/@20 μm.
*2: In Example 7, 600 ppm of Sb2O3 was added at the time of melt-kneading..

INDUSTRIAL APPLICABILITY

As shown by the results in the above Table 1 and FIGS. 4(a) and 4(b), aromatic polyester resin compositions obtained by blending a relatively small amount polyglycolic acid resin to an aromatic polyester resin, and performing the melt-kneading (and heat treatment) so as to control the transesterification rate of the blended polyglycolic acid resin in the range of 20 to 60%, according to the present invention, provided a very good harmony of gas-barrier property and transparency.

The invention claimed is:

1. An aromatic polyester composition, comprising: a melt-kneaded product of 99-70 weight parts of an aromatic polyester resin and 1-30 wt, parts (providing a total of 100 wt, parts together with the aromatic polyester resin) of a polyglycolic acid resin having a weight-average molecular weight of at most 20,000, wherein the composition is characterized by a transesterification rate $C_{TE}$ (%) of 20-60% determined by formula (1) below based on a peak integration ratio of methylene group in polyglycolic acid appearing at σ4.87 ppm with reference to tetramethylsilane according to $^1$H-NMR measurement:

$$C_{TE}(\%)=[1-I(B)/I(A)]\times 100 \quad (1),$$

wherein I (A): a peak integration ratio of methylene group of the polyglycolic acid main chain with respect to alkylene group of the aromatic polyester main chain calculated from the components weight ratio; and I (B): a peak integration ratio of methylene group of polyglycolic acid main chain to alkylene group of the aromatic polyester main chain in the resin composition.

2. A resin composition according to claim 1, wherein the aromatic polyester is polyethylene terephthalate.

3. A composition according to claim 1, wherein the polyglycolic acid resin has a weight-average molecular weight of 10,000 to 20,000.

4. A form resin product, obtained by stretching a resin composition according to claim 1.

5. A process for producing an aromatic polyester resin composition according to claim 1, comprising: melt-kneading 99-70 wt, parts of an aromatic polyester resin, and 1-30 wt, parts (providing a total of 100 wt, parts together with the aromatic polyester resin) of a polyglycolic acid resin having a weight-average molecular weight of at most 20,000, and heat-treating the composition during or after the melt-kneading to cause transesterification so as to provide a controlled transesterification rate $C_{TE}$ (%) in a range of 20 to 60%.

6. A production process according to claim 5, wherein the transesterification under melt-kneading is promoted by using a polyglycolic acid resin having a weight-average molecular weight of 10,000 to 20,000.

7. A production process according to claim 5, wherein the resin composition after the melt-kneading is heat-treated at a temperature below the melting point of the aromatic polyester resin to additionally increase the transesterification rate $C_{TE}$.

8. A production process according to claim 5, wherein the melt-kneading is performed at a temperature of 240 to 330° C. for 1 to 15 minutes.

* * * * *